United States Patent [19]
Williams

[11] 3,818,430
[45] June 18, 1974

[54] TRAFFIC DETECTOR USING BALUN TRANSFORMER PHASE DETECTOR
[75] Inventor: John E. Williams, San Jose, Calif.
[73] Assignee: United Aircraft Corporation, East Hartford, Conn.
[22] Filed: Apr. 30, 1973
[21] Appl. No.: 355,398

[52] U.S. Cl............................. 340/38 L, 340/258 C
[51] Int. Cl................................................ G08g 1/01
[58] Field of Search .......... 340/38 L, 258 R, 258 C, 340/38 R

[56] References Cited
UNITED STATES PATENTS

| | | | |
|---|---|---|---|
| 2,943,306 | 7/1960 | Gray et al. | 340/38 L |
| 3,103,655 | 9/1963 | Jones | 340/258 C |
| 3,222,637 | 12/1965 | Gray | 340/38 L |
| 3,375,511 | 3/1968 | Trimble et al. | 340/258 R |
| 3,571,789 | 3/1971 | Midlock | 340/38 L |
| 3,587,040 | 6/1971 | Fathauer | 340/38 L |
| 3,676,772 | 7/1972 | Lee | 340/258 C |

Primary Examiner—Kathleen H. Claffy
Assistant Examiner—Randall P. Myers
Attorney, Agent, or Firm—Donald F. Bradley

[57] ABSTRACT

A traffic detector is disclosed in which an output is produced when a metal object is in proximity to a coil implanted in a roadway. The coil is part of a resonant sensing circuit and is excited by the same oscillator that excites a resonant reference circuit. The phase change between the two circuits caused by the presence of an object near the coil is passed by a balun transformer phase detector and fed to a level detector which produces an output when a predetermined signal threshold is exceeded.

3 Claims, 3 Drawing Figures

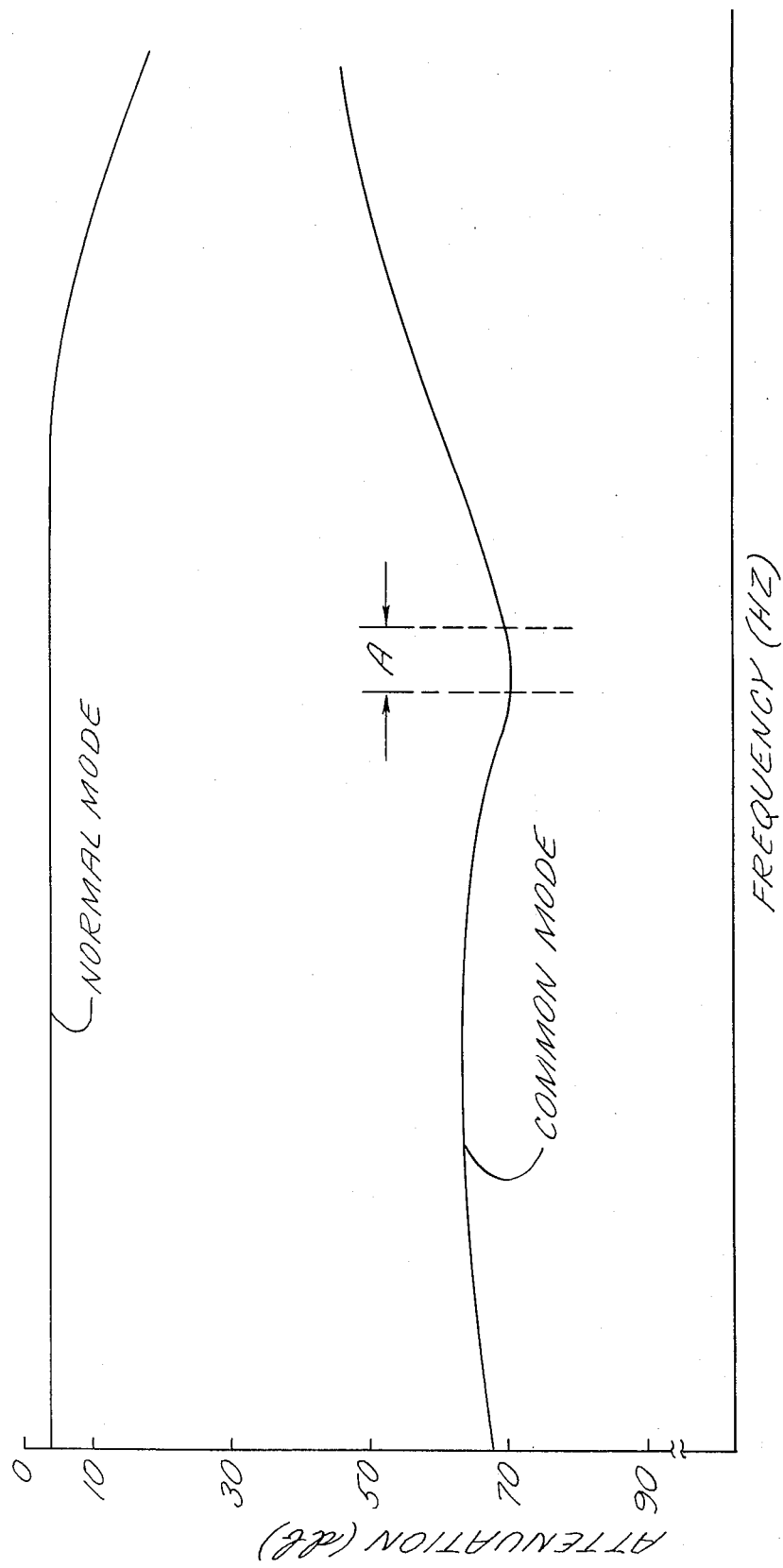

3,818,430

TRAFFIC DETECTOR USING BALUN TRANSFORMER PHASE DETECTOR

BACKGROUND OF THE INVENTION

1. Field of the Invention

This invention relates to traffic detectors, and particularly to electronic detectors which produce an output when a metal object is in proximity to a coil implanted in the roadway. The operation of the detector depends on the measurement of a phase difference between two circuits that are excited by the same oscillator. The traffic detector has a wide tolerance to variations in voltage, frequency and temperature, and is less complex and more reliable than present detector schemes.

2. Description of the Prior Art

Traffic detectors for determining the presence of an object such as a vehicle are well known at the present time, and many such detectors are commonly used to control the movement of vehicular traffic at busy intersections. In many traffic detectors it is common to use an inductive loop positioned to generate a magnetic field in a path for vehicles, the inductive characteristics of the loop being varied when the metallic mass of a vehicle moves into a magnetic field. There are commercially available vehicle presence detectors wherein an inductive loop is connected as part of a tuned circuit for controlling the frequency of an oscillator. In this type of system a vehicle which enters the field of the loop will cause an inductance change in the loop which will in turn change the frequency of the oscillator. By sensing the change in the oscillator frequency, an output signal is provided.

Other inductive loop presence detectors use fixed frequency oscillators for generating a signal which is passed through a phase shifting circuit including an inductive loop. When a vehicle moves into the field of the loop, a change occurs in the phase angle, and a phase discrimination circuit provides an output signal.

The prior art traffic detectors suffer from a variety of problems including sensitivity to environmental changes in the loop area such as temperature, pressure, moisture, etc. Furthermore, many detectors are unduly complex and expensive.

The present invention is an improvement on the prior art devices and provides a simple and reliable traffic detector which is compatible with existing inductive loop detector coils that are implanted in the roadway, which has a minimum of active elements, and which is simple and reliable while maintaining the desired sensitivity.

SUMMARY OF THE INVENTION

In accordance with the preferred embodiment of the present invention, there is provided a traffic detector in which the inductive loop road coil is connected as part of an oscillator driven resonant sensing circuit. A reference circuit is driven by the same oscillator at the same frequency as the sensing circuit. The presence of an object such as a vehicle in proximity to the inductive loop road coil will change the phase of the sensing circuit relative to the reference circuit output. A balun transformer phase detector is connected to receive the outputs from both resonant circuits, and the phase change produced by the presence of an object will pass through the phase detector practically unattenuated and actuate a tunnel diode level detector when a predetermined signal threshold is exceeded. The level detector can be adjusted to produce an output signal as long as the sensed object remains in proximity to the inductive loop. In another form of the invention, the beginning of the output signal may be used to trigger a detector or counter which provides an indication of the number of activations or counts.

BRIEF DESCRIPTION OF THE DRAWINGS

FIG. 2 shows in graph form the attentuation as a function of frequency of normal mode and common mode sine waves by the balun transformer phase detector of FIG. 1.

DESCRIPTION OF THE PREFERRED EMBODIMENT

Figure 1:
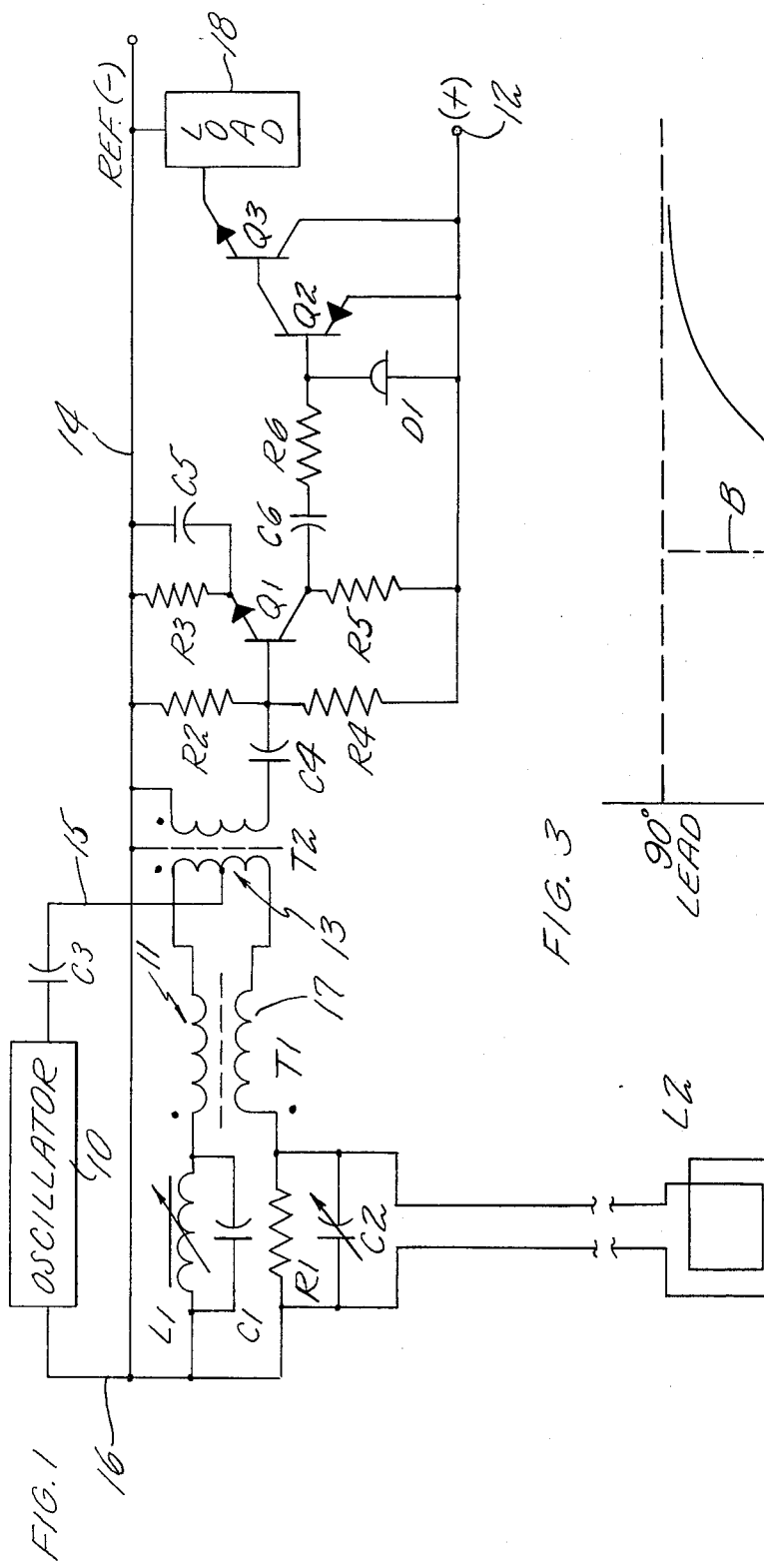
FIG. 1 is an electrical schematic drawing of a preferred embodiment of the traffic detector.

Referring specifically to FIG. 1, there is shown an oscillator 10 of any standard construction, and preferably one which can be powered by the dc voltage applied between terminal 12 and a common line 14 and which is also used to power the other circuit components. Oscillator 10 produces an output which is typically in the frequency range of 80KHz.

Connected to one side of oscillator 10 through a signal line 16 is a reference circuit comprising a variable inductance $L_1$ across which is connected a capacitor $C_1$. The reference circuit is connected to the other side of the oscillator 10 through one winding 11 of a balun transformer $T_1$ which is in turn connected to one end of the primary winding 13 of a center tapped balun transformer $T_2$. The center tap of the transformer $T_2$ is connected through line 15 and a capacitor $C_3$ to the oscillator 10.

Also connected to the oscillator 10 through line 16 is a resonant sensing circuit comprising a resistor $R_1$, a capacitor $C_2$ and an inductance $L_2$ all in parallel. The inductance $L_2$ is preferably a standard coil of approximately 100 microhenries inductance which may be embedded in the roadway. The sensing circuit is connected to the other side of oscillator 10 through one winding 17 of balun transformer $T_1$ which is in turn connected to the end of the primary winding 13 of balun transformer $T_2$ opposite which the reference resonant circuit is connected.

The reference circuit consisting of $L_1$ and $C_1$ is adjusted to be near resonance at the frequency of oscillator 10. The resonant sensing circuit is tuned so that its input to the balun transformer $T_1$ is in phase with respect to the phase of the reference circuit. The input to $T_1$ will be a common mode signal with respect to signal line 14. Common mode signals are those at the input of a two terminal circuit that are of equal amplitude and in phase with respect to a reference point. Normal mode is a voltage difference between the two input terminals. The resistor $R_1$ is used to reduce the $Q$ of the sensing circuit so that when the $L_2$ inductance is affected by vehicle proximity, the phase change in the sensing circuit is large relative to the change in amplitude.

The inductive loop $L_2$ installed in the roadway is adjusted by changes in the capacitor $C_2$ in order to compensate for the differences in coil forms and transmission lines. Frequency adjustment is made so that the loop is at or near resonance and is very sensitive to metal mass. The reference circuit $C_1$, $L_1$ is phase adjusted to match the loop, producing phase matched signals at the input to balun transformer $T_1$. The output from the balun transformer $T_2$ will be at a null when the inputs are in phase. When a change in inductance is produced in the loop detector $L_2$, a phase shift will occur in the circuit and a normal mode voltage will be produced. The phase will shift in the same relative direction from resonance whether the inductance is increased or decreased. Therefore, the sensing of both ferro-magnetic and nonmagnetic materials will be accomplished.

Figure 3:
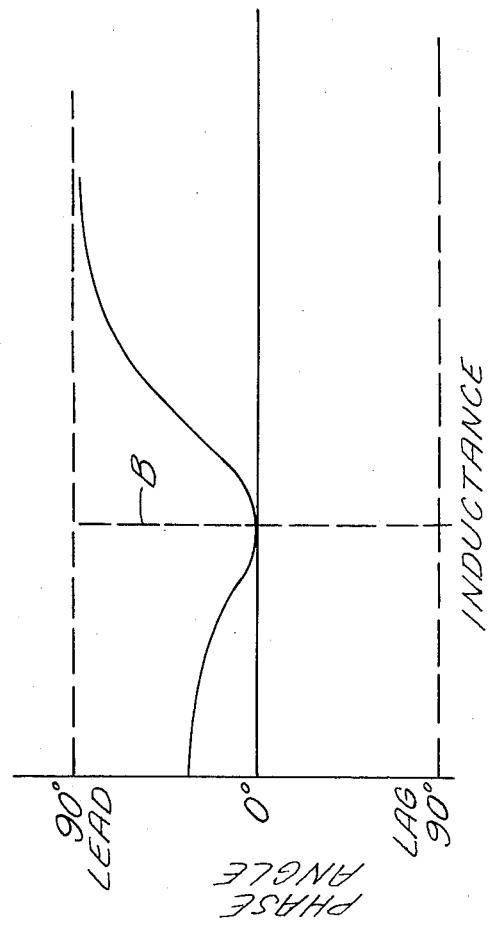
FIG. 3 shows in graph form the change in phase angle with the variation of inductance in a parallel circuit.

The response of the sensing circuit to changes in inductance $L_2$ caused by the proximity of a metallic object such as a vehicle adjacent the coil $L_2$ is shown in FIG. 3. Regardless of whether the inductance increases or decreases from resonance which is shown at B, the phase angle will always lead with respect to the phase at the resonant point.

The use of a single oscillator 10 for both the reference and sensing circuits coupled with the circuit characteristics of the balun transformers $T_1$ and $T_2$ and the phase response of the circuits prevents a small shift in either the amplitude or frequency of the oscillator from affecting the operation of the traffic detector.

Balun transformers $T_1$ and $T_2$ when connected as shown in FIG. 1 act as a phase detector. Transformer $T_1$ is a differentially connected, series opposed, Faraday screened balun, the output from which is connected to transformer $T_2$ which is a parallel connected, center tapped balun, also with a Faraday screen. Balun $T_1$ is connected into the circuit as a series device, and will reject common mode signals with respect to reference line 14, and will pass the normal mode signals from the reference and sensing circuits. As noted previously, the circuits are initially adjusted to be in common mode with no object in proximity to coil $L_2$. The presence of a metallic object in proximity to coil $L_2$ will change the phase of the signal produced by the sensing circuit and will produce a normal mode input to balun $T_1$. FIG. 2 shows the attenuation characteristics of the compound circuit configuration of balun $T_1$ and balun $T_2$. As noted in the figure, common mode signals are severely attenuated, while normal mode signals suffer practically no attenuation. Consequently, when the presence of a metallic object in proximity to coil $L_2$ causes a phase shift in the sensing circuit, the signal seen by the balun transformers $T_1$ and $T_2$ will shift from a highly attenuated common mode signal to a normal mode signal which will produce a larger output at the secondary winding of balun transformer $T_2$. Since an attenuation of approximately 70 db is attained for common mode signals as shown by the preferred range of operation A of FIG. 2, and since normal mode signals are attenuated only about 4 db, there is approximately a 10,000 to 1 ratio between normal mode sensitivity and common mode sensitivity.

The use of balun transformers as a phase detector rather than commonly used active elements produces a detector that is practically immune to environmental changes such as temperature and humidity. It is also virtually insensitive to power line variables, transients or electromagnetic interference.

The output from the phase detector at the secondary winding of balun $T_2$ may be amplified if required, and then fed as the input to a level detector. As shown in FIG. 1, the output is coupled through a capacitor $C_4$ and fed to the base junction of a transistor amplifier $Q_1$. Resistors $R_2$ and $R_4$ provide a bias to the base of normally conducting transistor $Q_1$ independent of the impedance of transformer $T_2$. The emitter junction of transistor $Q_1$ is connected to the reference voltage 14 through resistor $R_3$ and its parallel capacitor $C_5$. A positive voltage is supplied to the collector of transistor $Q_1$ through resistor $R_5$.

The amplified signal at the collector junction of transistor $Q_1$ is fed through a small capacitor $C_6$ and resistor $R_6$ to a tunnel diode $D_1$ used as a level detector. When the amplitude of the signal at the input to diode $D_1$ is of sufficient magnitude, the tunnel diode will conduct, thereby applying a sufficient voltage at the base junction of transistor $Q_2$ to cause conduction thereof, driving base current into transistor $Q_3$ and in turn driving current through the load 18. Load 18 is only limited to the power capability of $Q_3$ and can be for example a lamp, relay, or the input to any logic circuits required for the traffic controller.

The conduction level of tunnel diode $D_1$ may be adjusted by variations in the resistance of $R_6$ so that a residual signal or an environmentally caused change in phase or amplitude will not produce a false output. The ac coupled tunnel diode is an accurate low level detector with a wide tolerance for slow changes, but high sensitivity to the phase detector output. Because the balun transformers are used as a phase detection system, amplitude changes in the sensing circuit $C_2$, $L_2$ have a much lower effect on the output than that caused by the phase shift. The ability to discriminate between amplitude and phase will allow the circuit to compensate for road loop changes due to temperature, moisture and environmental changes which do not change the inductance of the loop $L_2$, but which cause a difference in resistance and in $Q$.

It is apparent that numerous changes may be made to the specific construction and operation of the traffic detector described herein without departing from the scope of the invention as hereinafter claimed.

I claim:

1. A circuit for detecting the presence of a metallic object comprising
    a first resonant circuit,
    a second resonant circuit including a loop coil,
    an oscillator providing an output,
    means for supplying the output from said oscillator simultaneously to said first and second resonant circuits, said first and second resonant circuits producing outputs signals which are in common mode relative to each other when there is no metallic object proximate to said loop coil and which are in normal mode relative to each other when a metallic object is proximate to said loop coil,
    a phase comparator circuit for receiving the output signals from said first and second resonant circuits, said phase comparator comprising a first balun transformer having a pair of series opposed, differentially connected windings, means connecting one of said resonant circuits to each of said windings, a second balun transformer comprising a center-referenced primary winding and a parallel, differentially connected output winding, means connecting one of said windings from said first transformer to each end of said second transformer primary winding, means connecting the output winding of said second balun transformer to a level detector, and load means connected with and responsive to actuation of said level detector.

2. A circuit as in claim 1 in which said level detector comprises a tunnel diode which is actuated when the signal on the output winding of said second balun transformer exceeds a predetermined magnitude.

3. A traffic detector circuit for indicating the presence of a vehicle in a roadway comprising an oscillator circuit, a first parallel resonant circuit connected to said oscillator circuit, a second parallel resonant circuit connected to said oscillator circuit and including a loop coil adapted to be embedded in a roadway, a first balun transformer having a pair of series opposed, differentially connected windings, means connecting one of said resonant circuits to each of said windings, a second balun transformer comprising a center-referenced primary winding and a parallel, differentially connected secondary winding, means connecting one of said windings from said first transformer to each end of said second transformer primary winding, a level detector, means connecting the secondary winding from said second transformer with said level detector, and a load circuit connected with said level detector.

* * * * *